(12) United States Patent
Hayashi et al.

(10) Patent No.: US 11,616,905 B2
(45) Date of Patent: *Mar. 28, 2023

(54) RECORDING REPRODUCTION APPARATUS, RECORDING REPRODUCTION METHOD, AND PROGRAM

(71) Applicant: JVCKENWOOD CORPORATION, Yokohama (JP)

(72) Inventors: Keita Hayashi, Yokohama (JP); Toshitaka Murata, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 48 days.

This patent is subject to a terminal disclaimer.

(21) Appl. No.: 17/366,952

(22) Filed: Jul. 2, 2021

(65) Prior Publication Data

US 2021/0337111 A1   Oct. 28, 2021

Related U.S. Application Data

(63) Continuation of application No. 16/861,632, filed on Apr. 29, 2020, now Pat. No. 11,115,587, which is a (Continued)

(30) Foreign Application Priority Data

Jun. 6, 2018   (JP) .............................. JP2018-108741

(51) Int. Cl.
*G06V 40/16* (2022.01)
*H04N 5/232* (2006.01)

(52) U.S. Cl.
CPC ....... *H04N 5/23219* (2013.01); *G06V 40/165* (2022.01); *G06V 40/166* (2022.01)

(58) Field of Classification Search
CPC .................................................. H04N 5/23219
See application file for complete search history.

(56) References Cited

U.S. PATENT DOCUMENTS

| 11,115,587 B2 * | 9/2021 | Hayashi | G06V 20/56 |
| 2007/0164988 A1 * | 7/2007 | Ryu | G06F 3/013 |
|  |  |  | 345/156 |

(Continued)

FOREIGN PATENT DOCUMENTS

| CN | 103019524 A | 4/2013 |
| CN | 103824346 A | 5/2014 |

(Continued)

*Primary Examiner* — Edward Park
(74) *Attorney, Agent, or Firm* — Procopio, Cory, Hargreaves & Savitch LLP

(57) ABSTRACT

A recording reproduction apparatus includes: a captured data acquisition unit configured to acquire first captured data captured by a first camera that captures an image of an outside of a moving body and second captured data captured by a second camera that captures an image in a direction opposed to a display surface of a display unit; an event detection unit configured to detect an event on the moving body; a recording controller configured to store, when an event has been detected, the first captured data as event recording data; a face detection unit configured to detect a human face from the second captured data; a reproduction controller configured to reproduce the event recording data when a human face has been detected within a period after storage of the event recording data; and a display controller configured to cause the display unit to display the reproduced event recording data.

6 Claims, 10 Drawing Sheets

Related U.S. Application Data continuation of application No. PCT/JP2019/018576, filed on May 9, 2019.

(56) References Cited

U.S. PATENT DOCUMENTS

| | | |
|---|---|---|
| 2010/0171829 A1 | 7/2010 | Yago et al. |
| 2013/0076499 A1 | 3/2013 | Okita |
| 2019/0124301 A1 | 4/2019 | Yoshi et al. |

FOREIGN PATENT DOCUMENTS

| | | |
|---|---|---|
| EP | 2848471 A1 | 3/2015 |
| JP | 2007036846 A | 2/2007 |
| JP | 2009-087007 A | 4/2009 |
| KR | 20160097032 A | 8/2016 |

\* cited by examiner

RECORDING REPRODUCTION APPARATUS, RECORDING REPRODUCTION METHOD, AND PROGRAM

CROSS REFERENCE TO RELATED APPLICATION

This application is a Continuation of U.S. patent application Ser. No. 16/861,632, filed on Apr. 29, 2020, which claims priority to PCT/JP2019/018576 filed on May 9, 2019, which is based upon and claims the benefit of priority from Japanese patent application No. 2018-108741, filed on Jun. 6, 2018, the disclosure of which is incorporated herein in its entirety by reference.

BACKGROUND

The present disclosure relates to a recording reproduction apparatus, a recording reproduction method, and a program, and more particularly, to a recording reproduction apparatus, a recording reproduction method, and a program for appropriately reproducing data in which an accident occurring with regard to a moving body such as an automobile that has been detected is recorded.

Dashboard cameras that detect an impact on a vehicle and store video images for a predetermined period of time before and after the timing when the impact has been detected as event recording data in such a way that this data is not overwritten have become widespread. For example, Japanese Unexamined Patent Application Publication No. 2009-087007 discloses a dashboard camera that records video data based on transition of acceleration.

SUMMARY

In many dashboard cameras including the aforementioned dashboard camera disclosed in Japanese Unexamined Patent Application Publication No. 2009-087007, in order to reproduce event recording data stored when an event occurring due to an accident or the like is detected for the purpose of checking the circumstances of the accident, it is required to operate the dashboard camera, select the event recording data, which is the target to be reproduced, and perform an operation of reproducing the corresponding data. Alternatively, it is required to remove a memory card or the like that stores event recording data recorded by the dashboard camera and to reproduce the corresponding data in another apparatus.

It is possible, however, the event recording data may not be appropriately reproduced when the circumstances of the accident are checked such as in a case in which the user of the dashboard camera does not know the functions of the dashboard camera very well.

This embodiment has been made in view of the aforementioned problem and aims to provide a recording reproduction apparatus, a recording reproduction method, and a program capable of easily checking event recording data.

A recording reproduction apparatus according to this embodiment includes: a captured data acquisition unit configured to acquire first captured data captured by a first camera that captures an image of an outside of a moving body and second captured data captured by a second camera that captures an image in a direction that is opposed to a display surface of a display unit; an event detection unit configured to detect an event on the moving body; a recording controller configured to store, when the event detection unit has detected an event, the first captured data including at least data at a timing when the event has occurred as event recording data; a face detection unit configured to detect a human face from the second captured data; a reproduction controller configured to reproduce the event recording data when the face detection unit has detected a human face within a predetermined period after the storage of the event recording data; and a display controller configured to cause the display unit to display the event recording data reproduced by the reproduction controller.

A recording method according to this embodiment includes: a first captured data acquisition step for acquiring first captured data captured by a first camera that captures an image of an outside of a moving body; an event detection step for detecting an event on the moving body; a recording step for storing, when an event has been detected, the first captured data including at least data at a timing when the event has occurred as event recording data; a second captured data acquisition step for acquiring second captured data captured by a second camera that captures an image in a direction that is opposed to a display surface of a display unit; a face detection step for detecting a human face from the second captured data; a reproduction step for reproducing the event recording data when the human face has been detected within a predetermined period after the storage of the event recording data in the recording step; and a display step for causing the display unit to display the event recording data reproduced in the reproduction step.

A program according to this embodiment causes a computer operating as a recording reproduction apparatus to execute the following steps: a first captured data acquisition step for acquiring first captured data captured by a first camera that captures an image of an outside of a moving body; an event detection step for detecting an event on the moving body; a recording step for storing, when an event has been detected, the first captured data including at least data at a timing when the event has occurred as event recording data; a second captured data acquisition step for acquiring second captured data captured by a second camera that captures an image in a direction that is opposed to a display surface of a display unit; a face detection step for detecting a human face from the second captured data; a reproduction step for reproducing the event recording data when the human face has been detected within a predetermined period after the storage of the event recording data in the recording step; and a display step for causing the display unit to display the event recording data reproduced in the reproduction step.

According to this embodiment, it is possible to easily check event recording data.

DETAILED DESCRIPTION

In the following description, with reference to the drawings, embodiments of the present disclosure will be explained. While the descriptions will be given taking an example of a dashboard camera used in an automobile, which is a moving body, as an example of a recording reproduction apparatus according to the embodiments in the following description, the present disclosure is not limited thereto. The present disclosure can be applied also to, for example, various types of moving bodies such as vehicles like motorcycles or automobiles, railroads, ships, robots, and persons. Further, the present disclosure is not limited by the following embodiments.

Figure 1:
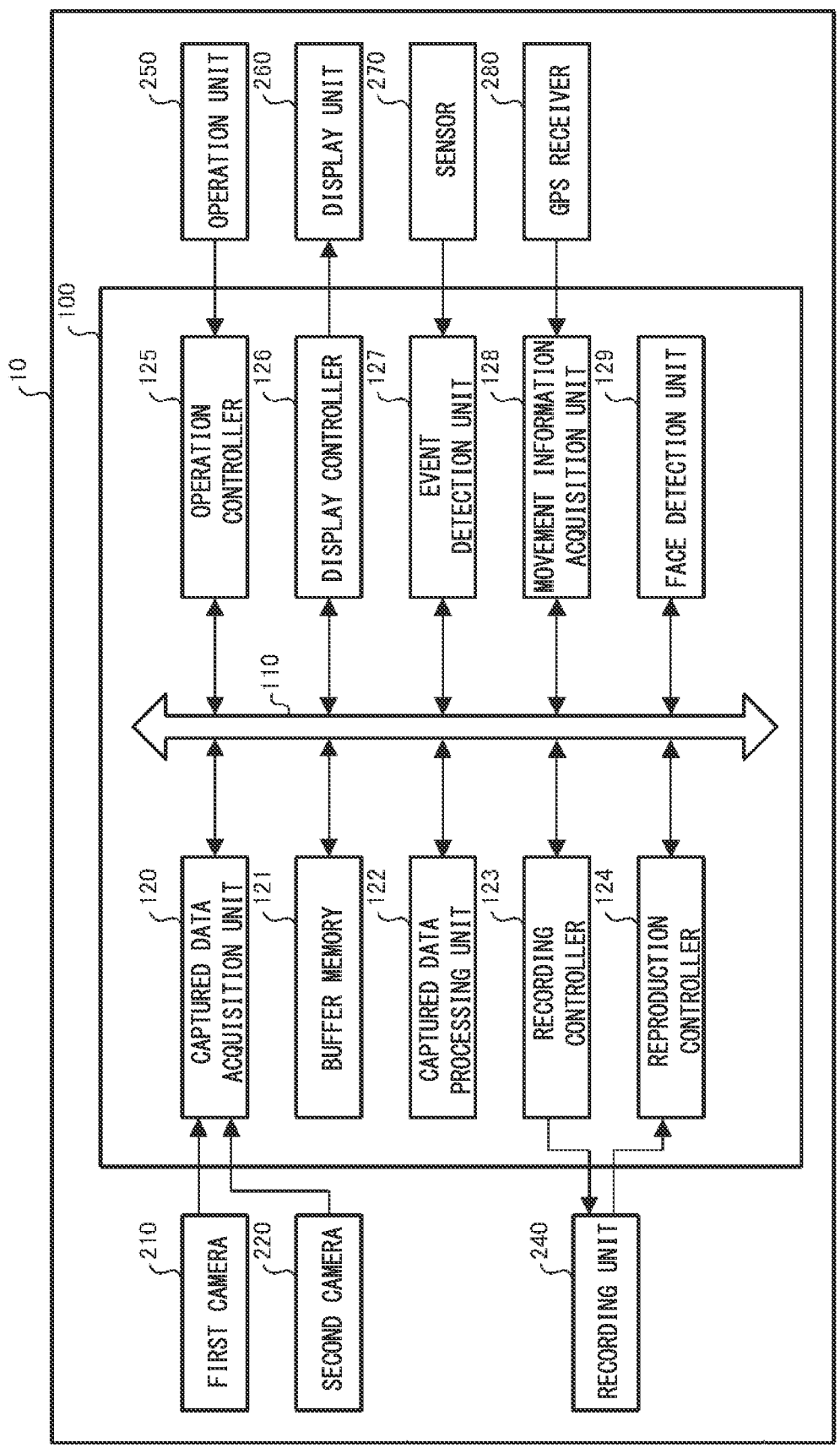
FIG. 1 is a block diagram showing a configuration of a recording reproduction apparatus according to a first embodiment of the present disclosure.

Hereinafter, with reference to FIGS. 1 to 5, a first embodiment of the present disclosure will be explained. FIG. 1 is a block diagram showing a configuration of a recording reproduction apparatus 10 according to the first embodiment of the present disclosure. The recording reproduction apparatus 10 is mounted above a windshield of a vehicle as a dashboard camera in such a way that it is directed toward a front side of the vehicle, detects an impact that corresponds to an accident, and stores captured data during a period including the timing when an accident has occurred as event recording data. The recording reproduction apparatus 10 which serves as the dashboard camera is not limited to the one mounted on a vehicle as a single apparatus and may be applicable also to a configuration in which it is provided as a function of a navigation device or a configuration in which it is mounted on a vehicle in advance.

In FIG. 1, the recording reproduction apparatus 10 includes a controller 100, which is a recording control device, a first camera 210, a second camera 220, a recording unit 240, an operation unit 250, a display unit 260, a sensor 270, a Global Positioning System (GPS) receiver 280.

While the recording reproduction apparatus 10 is mounted on the vehicle in such a way that the capturing direction of the first camera 210 that captures an outside of the vehicle is directed to the front side of the vehicle, it may be mounted on the vehicle in such a way that the capturing direction of the first camera 210 is directed to the back side or the lateral side of the vehicle. Further, the recording reproduction apparatus 10 may be an integrated apparatus or may be provided in a plurality of apparatuses in a dispersed manner.

Figure 2:
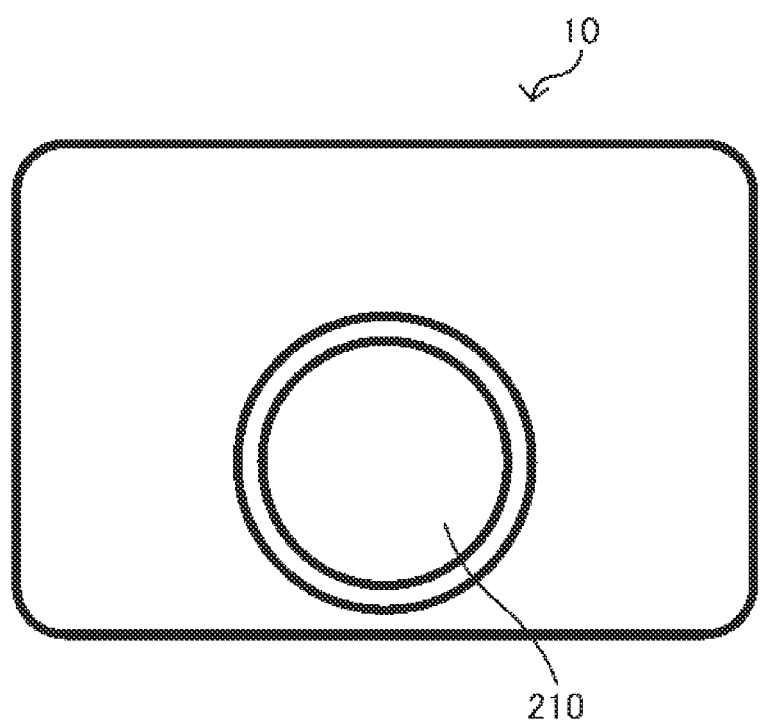
FIG. 2 is a diagram showing the exterior of the recording reproduction apparatus according to the first embodiment of the present disclosure.

FIG. 2 is a diagram showing the exterior of the recording reproduction apparatus 10 according to the first embodiment of the present disclosure, and is a front view when the recording reproduction apparatus 10 is seen from the direction in which an outside of the vehicle is captured. That is, FIG. 2 shows a view when the recording reproduction apparatus 10 is seen from the direction in which the first camera 210 captures images.

Figure 3:
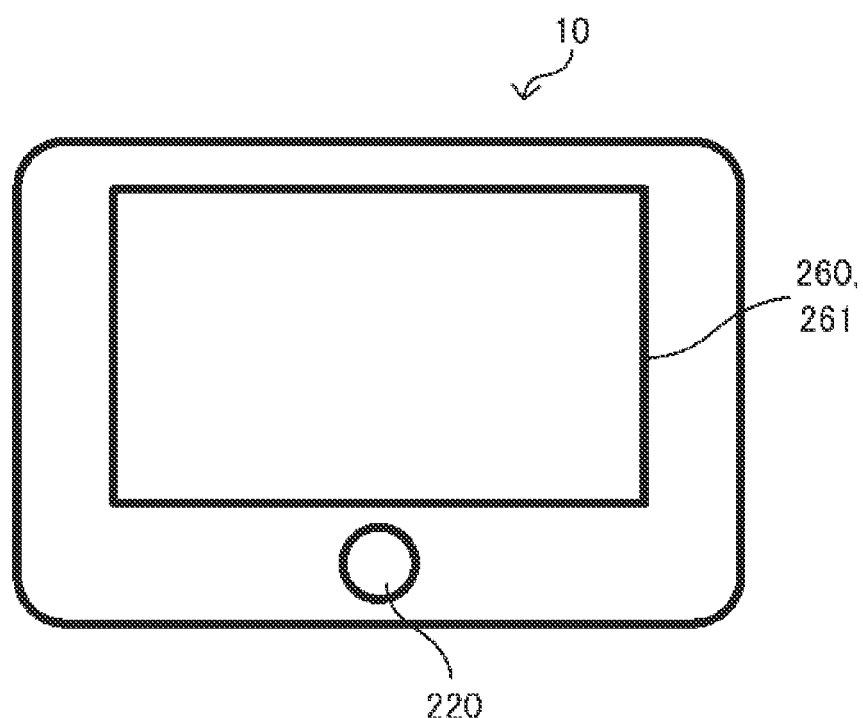
FIG. 3 is a diagram showing the exterior of the recording reproduction apparatus according to the first embodiment of the present disclosure.

FIG. 3 is a diagram showing the exterior of the recording reproduction apparatus 10 according to the first embodiment of the present disclosure, and is a back view when the recording reproduction apparatus 10 is seen from the direction opposite to the direction in FIG. 2. That is, the second camera 220 and a display surface 261 of the display unit 260 shown in FIG. 3 are arranged on the same plane.

When the recording reproduction apparatus 10 is mounted above the windshield of the vehicle in such a way that it is directed to the front side of the vehicle so as to capture images on the front side of the vehicle, the first camera 210 in FIG. 2 can capture images on the front side, which is an outside of the vehicle, via the windshield of the vehicle, and the second camera 220 and the display surface 261 of the display unit 260 are directed toward the cabin of the vehicle, in other words, toward the driver.

With reference once again to FIG. 1, the controller 100 is formed of one or a plurality of Central Processing Units (CPUs), Graphics Processing Units (GPUs), buffer memories 121 etc. that perform various types of data processing, and executes various kinds of processing by programs. The controller 100 at least includes, as its components and functions, a bus line 110, a captured data acquisition unit 120, a captured data processing unit 122, a recording controller 123, a reproduction controller 124, an operation controller 125, a display controller 126, an event detection unit 127, a movement information acquisition unit 128, and a face detection unit 129. In the following description, the components of the controller 100 are described to be the ones that exchange data such as captured data via the bus line 110.

The controller 100, which is a recording control device that executes operations according to the present disclosure in the recording reproduction apparatus 10, executes a recording method according to the present disclosure. Further, the controller 100 is a computer that operates a program according to the present disclosure.

The first camera 210 captures images of an outside of the vehicle, which is a moving body. The first camera 210 may be integrated with the recording reproduction apparatus 10 or may be connected thereto as a separate component by a wire or wirelessly. Further, a unit including the first camera 210 and the captured data acquisition unit 120 may be connected thereto as a separate component by a wire or wirelessly. The first camera 210 includes a lens, an image-pickup element, an Analog to Digital (A-D) conversion element and the like, although they are not shown in the drawings. The first camera 210 outputs first captured data that has been captured to the captured data acquisition unit 120.

While only one first camera 210 is provided in FIG. 1, the first camera 210 may be formed of a plurality of cameras. The first camera 210 may be, for example, a plurality of cameras of a desired combination of cameras that capture respective images of the front side, the back side, the lateral side, and inside the cabin of the vehicle.

The second camera 220 captures images in the direction that is opposed to the display surface 261 of the display unit 260. The display unit 260 may be replaced by a display panel that forms the display unit 260. The second camera 220 may be integrated with the recording reproduction apparatus 10 or may be connected thereto as a separate component by a wire or wirelessly. Further, a unit that includes the second camera 220 and the captured data acquisition unit 120 may be connected thereto as a separate component by a wire or wirelessly. The second camera 220 includes a lens, an image-pickup element, an Analog to Digital (A-D) conversion element, although they are not shown in the drawings. The second camera 220 outputs second captured data that has been captured to the captured data acquisition unit 120.

While only one second camera 220 is shown in FIG. 1, the second camera 220 may be formed of a plurality of cameras. Further, the second camera 220 may be a camera that captures a visible light, a camera that captures an infrared region, or a combination thereof.

While the first camera 210 and the second camera 220 are described as cameras different from each other in FIG. 1, they may be a single camera as long as ranges to be captured by the aforementioned first camera 210 and second camera 220 can be captured by a single camera. The single camera is, for example, an all-around camera of 360 degrees.

The captured data captured by the first camera 210 and the second camera 220 is video data. The captured data may include, besides video data, audio data. In this case, the first camera 210 and the second camera 220 each include a microphone.

The recording unit 240, which is a non-volatile memory for recording the first captured data captured by the first camera 210 by the control performed by the recording controller 123, is, for example, a memory card. The first captured data recorded in the recording unit 240 is reproduced by control of the reproduction controller 124. The recording unit 240 may be replaced by a separate recording reproduction apparatus including the recording controller 123 and the reproduction controller 124 in addition to the recording unit 240. The recording unit 240 may be integrated with the recording reproduction apparatus 10 or may be connected thereto as a separate component by a wire or wirelessly.

The operation unit 250, which is an interface that accepts an operation on the recording reproduction apparatus 10, outputs information on the accepted operation to the operation controller 125. The operation unit 250, which is various kinds of buttons or a touch panel, accepts an operation by the user. The operation unit 250 may accept an operation by another apparatus connected thereto wirelessly. The operation unit 250 accepts, for example, a user's operation of starting recording of an event. Further, the operation unit 250 accepts a user's operation of performing reproduction of the event recording data.

The display unit 260 is a display device that displays various kinds of information by the control performed by the display controller 126. The display unit 260 includes a display panel such as a liquid crystal panel or an organic EL panel. The display unit 260 may be integrated with the recording reproduction apparatus 10 or may be connected thereto as a separate component by a wire or wirelessly. The display unit 260 may be another device that is connected wirelessly and includes the display controller 126.

The sensor 270, which is, for example, an acceleration sensor, detects acceleration applied to the recording reproduction apparatus 10 or the vehicle. The sensor 270, which is, for example, a three-axis acceleration sensor, detects acceleration applied in the front-back direction of the vehicle as the x-axis direction, right-left direction of the vehicle as the y-axis direction, and the vertical direction of the vehicle as the z-axis direction. The sensor 270 outputs the information on the detected acceleration to the event detection unit 127. The sensor 270 may be integrated with the recording reproduction apparatus 10 or may be connected thereto as a separate component by a wire or wirelessly. Further, the sensor 270 may be a separate component as a unit that includes the sensor 270 and the event detection unit 127.

The GPS receiver 280 is a GPS antenna that receives signals from a GPS satellite. The GPS receiver 280 outputs the received signals to the movement information acquisition unit 128. The GPS receiver 280 may be integrated with the recording reproduction apparatus 10 or may be connected thereto as a separate component by a wire or wirelessly. Further, the GPS receiver 280 may be a separate component as another apparatus including the GPS receiver 280 and the movement information acquisition unit 128.

The captured data acquisition unit 120 acquires the first captured data captured by the first camera 210 and the second captured data captured by the second camera 220. The captured data acquisition unit 120 outputs the first captured data acquired from the first camera 210 to the buffer memory 121. The captured data acquisition unit 120 outputs the second captured data acquired from the second camera 220 to the face detection unit 129.

The captured data acquisition unit 120 acquires, from the event detection unit 127, a signal indicating that an event has been detected. When the event has been detected, the captured data acquisition unit 120 may acquire the second captured data from the second camera 220. In this case, the captured data acquisition unit 120 may cause the second camera 220 to start its operation when the event has been detected.

The buffer memory 121, which is an internal memory included in the controller 100, temporarily stores captured data for a certain period of time acquired by the captured data acquisition unit 120 while updating this captured data.

The captured data processing unit 122 converts captured data that the buffer memory 121 temporarily stores into, for example, a desired file format such as MP4 format, which is encoded by a codec having a desired system such as H.264 or MPEG-4 (Moving Picture Experts Group). The captured data processing unit 122 generates captured data generated as a file for a certain period of time from the captured data that the buffer memory 121 temporarily stores. As a specific example, the captured data processing unit 122 generates 60-second captured data generated as a file in the order of recording from the captured data that the buffer memory 121 temporarily stores. The captured data processing unit 122 outputs the generated captured data to the recording controller 123. Further, the captured data processing unit 122 outputs the generated captured data to the display controller 126. While the period of the captured data generated as a file is set to be 60 seconds as one example, this is merely one example.

The recording controller 123 performs control to cause the recording unit 240 to record the captured data filed by the captured data processing unit 122. In the period during which the event detection unit 127 does not detect an event, the recording controller 123 records the captured data filed by the captured data processing unit 122 in the recording unit 240 as the captured data that can be overwritten. When the recording capacity of the recording unit 240 has reached the upper limit, the recording controller 123 overwrites the captured data that can be overwritten recorded in the recording unit 240 with new overwrite data from a recording area where old captured data is recorded. The captured data recorded by the recording controller 123 in the recording unit 240 is the first captured data captured by the first camera 210.

Upon receiving information indicating that the event detection unit 127 has determined that an event has occurred, the recording controller 123 stores the first captured data in a predetermined period including the event occurrence timing as event recording data that is prohibited from being overwritten.

A desired method may be used as the method of storing the event recording data by the recording controller 123. For example, a write-protected flag is added to a header or a payload of a section in which overwriting is prohibited in the first captured data, and the event recording data is stored in the recording unit 240. Alternatively, the section in which overwriting is prohibited in the first captured data is stored in the overwriting prohibited area of the recording unit 240. Alternatively, the section in which overwriting is prohibited in the first captured data is transmitted to another apparatus, where the event recording data is stored.

The reproduction controller 124 performs control for reproducing the captured data recorded in the recording unit 240. The reproduction controller 124 reproduces, besides the captured data that has been recorded in the recording unit 240 and can be overwritten, the event recording data where overwriting is prohibited, and outputs the reproduced data to the display controller 126.

The reproduction controller 124 starts, based on the results of the detection by the face detection unit 129, reproduction of the event recording data that has been stored most recently. Further, the reproduction controller 124 reproduces various types of captured data based on the reproduction instruction accepted by the operation unit 250.

The operation controller 125 acquires operation information that the operation unit 250 has accepted and outputs the operation instruction based on the operation information to each of the components. When the operation controller 125 has acquired an instruction for selecting various types of data, which are to be reproduced, from the operation unit 250, the operation controller 125 causes the reproduction controller 124 to select the file and the like recorded in the recording unit 240. When the operation controller 125 has acquired an instruction regarding reproduction of various types of data from the operation unit 250, the operation controller 125 causes the reproduction controller 124 to perform processing regarding reproduction. The instruction regarding reproduction of various types of data includes, for example, reproduction start, pause, reproduction stop, enlarged display, etc.

The display controller 126 performs control for causing the display unit 260 to display various types of information. The display controller 126 causes the display unit 260 to display, for example, first video data which is being captured by the first camera 210. Further, the display controller 126 causes the display unit 260 to display the event recording data stored in the recording unit 240 reproduced by the reproduction controller 124. Further, when the display unit 260 includes a touch panel function as the operation unit 250, the display controller 126 causes the display unit 260 to display an icon or the like for performing a touch operation.

The event detection unit 127 acquires the acceleration information detected by the sensor 270, which is an acceleration sensor, and determines that an event has been detected when acceleration that corresponds to an event has been detected. When the event detection unit 127 has determined that the event has been detected, the event detection unit 127 outputs information indicating that an event has been detected to the recording controller 123.

The event detection unit 127 determines whether the acceleration output from the sensor 270 corresponds to acceleration when a vehicle has collided with another object such as another vehicle and detects that the acceleration output from the sensor 270 as acceleration that corresponds to an event when it corresponds to the acceleration when the vehicle has collided with the other object such as the other vehicle. The acceleration that corresponds to an event may be weighted in each of the x-axis direction, the y-axis direction, and the z-axis direction. Further, acceleration that sharply rises may be detected as the acceleration that corresponds to the event.

The movement information acquisition unit 128 specifies, based on signals from a GPS satellite that the GPS receiver 280 has received, the current position for each time, and outputs the current positional information for each time to the recording controller 123. The movement information acquisition unit 128 specifies the latitude and the longitude as the current positional information. The movement information acquisition unit 128 may receive, besides signals from the GPS receiver 280, radio waves such as Wi-Fi (registered trademark), and specify the current position using positional information of an access point as well.

The face detection unit 129 detects a human face from the second captured data captured by the second camera 220 and acquired by the captured data acquisition unit 120. The face detection unit 129 uses a desired method such as pattern matching.

The face detection unit 129 determines whether the human face detected from the second captured data has come close to the display surface 261 of the display unit 260. In other words, the face detection unit 129 determines whether the human face detected from the second captured data has come close to the display surface 261 that composes the display unit 260. The face detection unit 129 determines, based on the distance of the human face or the compositions that compose the human face in the second captured data, whether the human face has come close to the display surface 261 of the display unit 260. When this determination is made, the distance between the second camera 220 and the human face is directly detected. However, as shown in FIG. 3, the display surface 261 of the display unit 260 and the second camera 220 are arranged on the same plane or on substantially the same plane in the housing of the recording reproduction apparatus 10. Therefore, the face detection unit 129 determines the distance between the second camera 220 and the human face to be the distance between the display surface 261 of the display unit 260 and the human face. Further, while an error occurs depending on the detected human face, it is sufficient that it can be determined that the person detected from the second captured data has come close to the display surface 261 of the display unit 260 in order to gaze at the display surface 261 of the display unit 260.

Further, the face detection unit 129 detects the opening degree of the eye in the human face detected from the second captured data. In other words, the face detection unit 129 determines, from the human face detected from the second captured data, whether this person is simply present in this position or this person is gazing at the display surface 261 of the display unit 260 based on the opening degree of the eye. The face detection unit 129 detects the opening degree of the eye from the gap between the upper and lower eyelids.

Further, the face detection unit 129 detects the line-of-sight in the human face detected from the second captured data. In other words, the face detection unit 129 recognizes the eye part from the human face detected from the second captured data, and determines, from a positional relation or the like of the iris in the recognized eye, whether the line-of-sight of the person detected from the second captured data is directed toward the display surface 261 of the display unit 260. Further, when the second camera 220 is a camera that captures an infrared region, the face detection unit 129 detects the line-of-sight based on reflection of a pupil or a cornea.

Further, the face detection unit 129 may determine whether the human face detected from the second captured data is a human face registered in advance. The person registered in advance, which is, for example, a driver, a passenger or the like of the vehicle, may be registered in advance before the vehicle travels or may be automatically registered while the vehicle is traveling. In other words, the face detection unit 129 determines whether the person registered in advance is gazing at the display surface 261 of the display unit 260. The face detection unit 129 may determine that the human face registered in advance has been detected when a plurality of faces have been concurrently detected from the second captured data and at least one of the plurality of faces that have been detected is a human face registered in advance.

Figure 4:
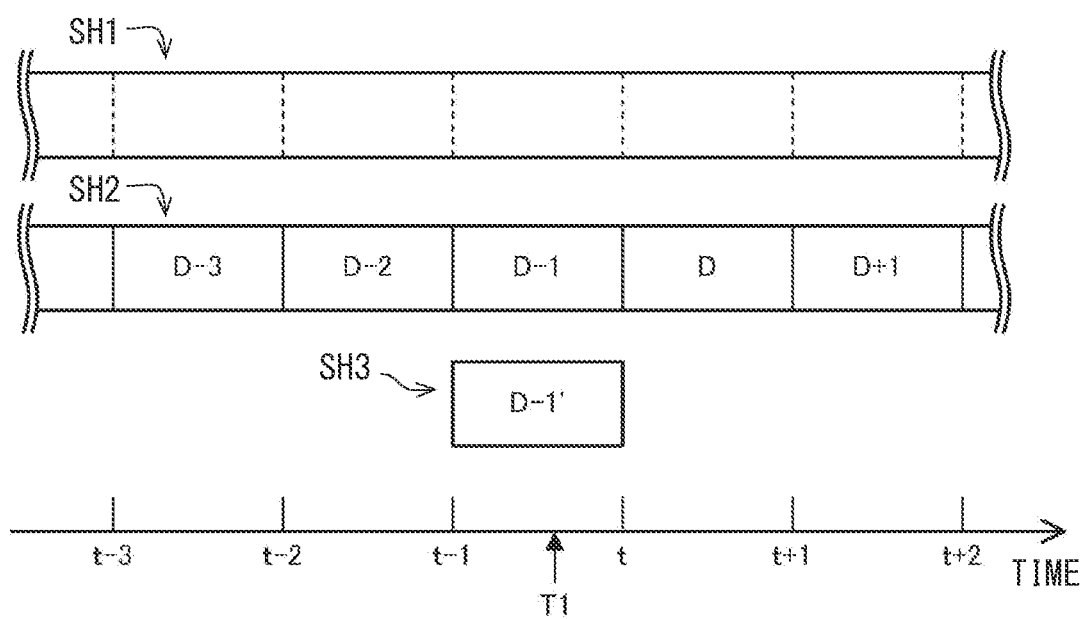
FIG. 4 is a diagram conceptually showing a relation between captured data and event recording data according to the first embodiment of the present disclosure.

Referring next to FIG. 4, the relation between the first captured data and the event recording data will be explained. FIG. 4 is a diagram conceptually showing a relation between the captured data and the event data. The horizontal axis of FIG. 4 indicates the passage of time, and indicates that the time passes toward the right direction.

The symbol SH1 in FIG. 4 indicates the first captured data acquired from the first camera 210 by the captured data acquisition unit 120 and temporarily stored in the buffer memory 121. The dotted lines of SH1 in FIG. 4 correspond to time t−3 to time t+2 described in the time axis, and each indicate the period for the captured data processing unit 122 to generate a file. Since a file has not yet been generated in the state in which the first captured data is temporarily stored in the buffer memory 121, the time is shown by the dotted lines.

The symbol SH2 in FIG. 4 indicates the first captured data obtained by filing, by the captured data processing unit 122, the first captured data temporarily stored in the buffer memory 121, and recorded, by the recording controller 123, in the recording unit 240. For example, the captured data D-3, which is data captured between time t−3 and time t−2, is filed and recorded in the recording unit 240 in a state in which it can be overwritten. Further, the captured data D-2, which is also data captured between time t−2 and time t−1, is filed and recorded in the recording unit 240 in a state in which it can be overwritten.

When, for example, the recording capacity of recording unit 240 has reached the upper limit, in the first captured data shown in SH2 in FIG. 4, the captured data before the captured data D-3 is overwritten, the captured data D-3 is overwritten next, and then the captured data D-2 is overwritten.

When, for example, an event has been detected at time T1, which is between time t−1 and time t, the first captured data in the period from a predetermined period of time before time T1, which is the event occurrence time, to a predetermined period of time after time T1 is stored as the event recording data. The predetermined period of time is, for example, but is not limited to, a period from 30 seconds before time T1, which is the event occurrence time, to 30 seconds after time T1.

As one example, when an event has been detected at time T1, which is between time t−1 and time t, the recording controller 123 stores the captured data D-1 in the overwriting prohibited area of the recording unit 240 as event recording data D-1'.

When, for example, the recording capacity of the recording unit 240 has reached the upper limit, in the first captured data shown in SH2 in FIG. 4, the captured data D-1 is overwritten after the captured data D-2 is overwritten. However, the captured data D-1 is definitely stored since it is stored in the overwriting prohibited area of the recording unit 240 shown in SH3 in FIG. 4 as event recording data D-1'.

The first captured data in the period from time t−1 to time t is filed, and the event recording data D-1' stored in the overwriting prohibited area of the recording unit 240 is event recording data including time T1, which is time when the event has occurred. The event recording data is not limited to the first captured data in a period generated as a file including the event occurrence timing. The event recording data may store, for example, the captured data in the period from a predetermined period of time before time T1, which is the event occurrence time, to a predetermined period of time after time T1 as the event recording data. The predetermined period of time is, for example, but is not limited to, 30 seconds.

Further, the storage of the event recording data is not limited to storage in the overwriting prohibited area of the recording unit 240. For example, the event recording data may be recorded in a recording unit included in another apparatus registered in advance using a communication function (not shown). As a specific example, the event recording data may be transmitted to a smartphone owned by a driver or a passenger that has been paired with the recording reproduction apparatus 10 in advance and has established communication with the recording reproduction apparatus 10. Alternatively, the event recording data may be transmitted to an apparatus such as a server owned by a driver, a person who has a relation with the driver, an insurance company, or a safety assurance company registered in the recording reproduction apparatus 10 in advance.

Each of the first captured data and the event recording data is preferably recorded in association with the positional information that the movement information acquisition unit 128 has acquired.

Figure 5:
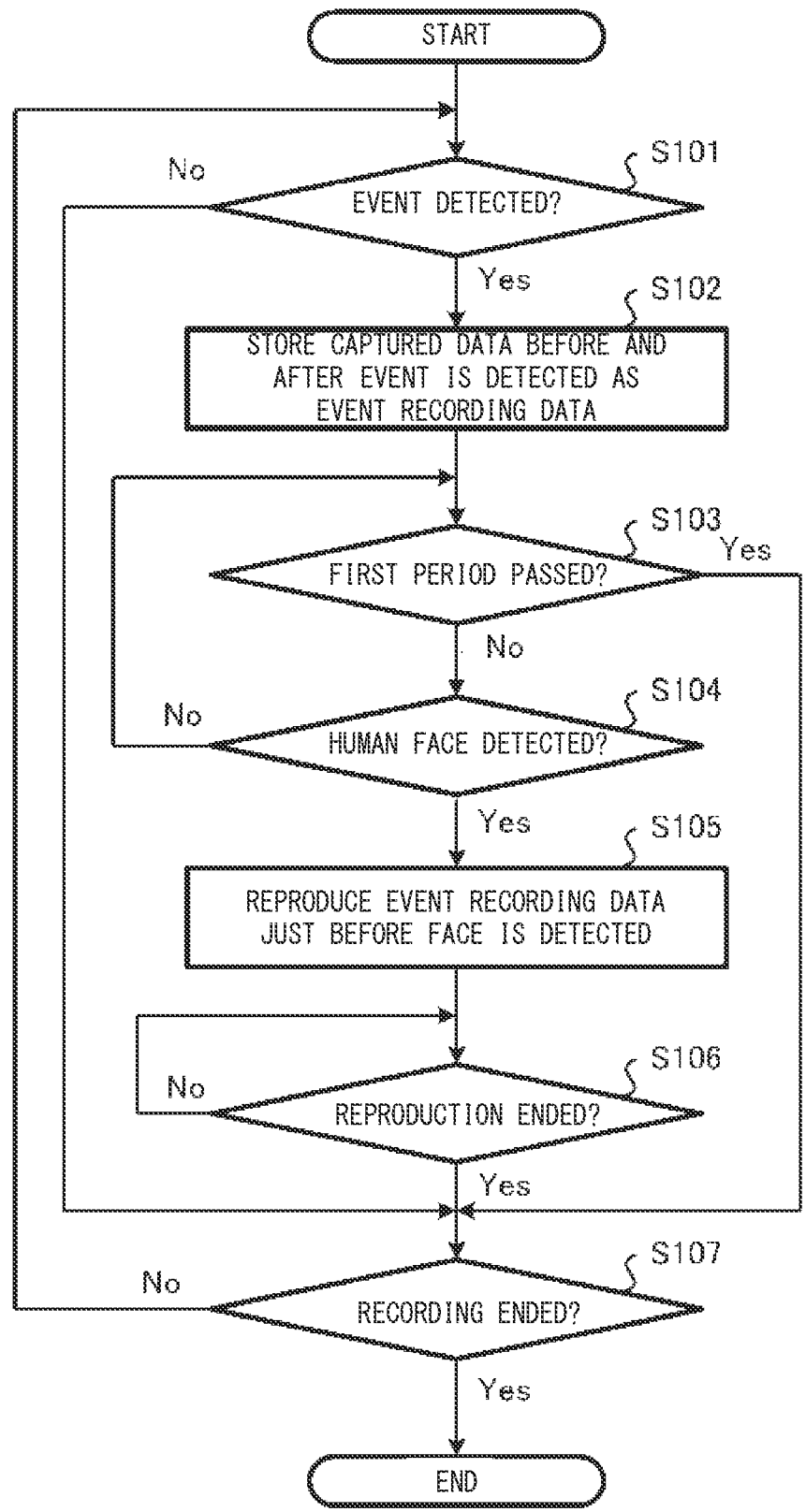
FIG. 5 is a flowchart showing a process example of the recording reproduction apparatus according to the first embodiment of the present disclosure.

Referring next to FIG. 5, a flow of recording reproduction processing executed by the recording reproduction apparatus 10 will be explained. The recording reproduction processing executed by the recording reproduction apparatus 10 is executed by the controller 100, which is a computer operating as a recording reproduction apparatus, based on a program. The functions of the controller 100 may be executed by control apparatuses included in a plurality of apparatuses or a plurality of units in a dispersed manner. In this case, the program can also be executed in a cooperative manner for each apparatus or each unit.

The start of the processing in FIG. 5 means, for example, that the engine, the power supply or the like of the vehicle, which is the moving body, is turned on and the recording reproduction apparatus 10 can be operated. The processing may be started when the operation unit 250 accepts an instruction to start recording reproduction processing.

Along with the start of the processing, the recording reproduction apparatus 10 starts recording the captured data and detecting an event. The start of the recording of the captured data includes start of acquisition of the first captured data from the first camera 210 by the captured data acquisition unit 120, filing of the first captured data by the captured data processing unit 122, and recording of the first captured data in the recording unit 240 by the recording controller 123. In this case, the first captured data is recorded in the recording unit 240 in a state in which it can be overwritten, and this recording is also referred to as normal recording or loop recording. Further, the start of the detection of the event means that the event detection unit 127 starts to acquire acceleration information from the sensor 270 and the detection of the event is started based on the acquired acceleration information.

Further, while each of the processes shown in FIG. 5 is being executed, the recording of the first captured data, the detection of the event by acquisition of the acceleration information, and the specification of the current positional information by the movement information acquisition unit 128 are continuously executed.

In Step S101, the event detection unit 127 determines whether an event has been detected. The event detection unit 127 determines that the event has been detected when the acceleration detected by the sensor 270 is, for example, acceleration that corresponds to a collision of an object with the vehicle. The acceleration that corresponds to a collision of an object with the vehicle may include a case in which the absolute value of the acceleration is equal to or larger than a predetermined threshold or a case in which the absolute value of the acceleration is equal to or larger than a predetermined threshold and the rising of this acceleration is sharp in a predetermined manner.

When it is determined in Step S101 that the event has been detected (Step S101: Yes), the recording controller 123 stores the first captured data including the data at the event occurrence timing detected in Step S101 as the event recording data (Step S102). The recording controller 123 stores the first captured data including the data at the event occurrence timing in the overwriting prohibited area of the recording unit 240 as shown in, for example, FIG. 4.

When it is determined in Step S101 that the event has not been detected (Step S101: No), the process moves to Step S107.

When the event recording data has been stored in Step S102, the recording controller 123 determines whether a first period has passed after the storage of the event recording data in Step S102 (Step S103). The processing of Step S103 may be determination regarding whether the first period has passed after the detection of the event. The first period is preferably a period including a period during which, after an event such as an accident occurs, a person involved in this accident or a person related to this accident tries to reproduce and check the event recording data that corresponds to this event. In other words, when there is no reproduction request until the first period passes after the storage of the event recording data, it can be said that the event recording data is the one that is not required to be reproduced and checked since this event is not due to an accident. The first period is, for example, ten minutes.

When the recording controller 123 has determined, in Step S103, that the first period has not passed (Step S103: No), the face detection unit 129 determines whether the human face has been detected from the second captured data captured by the second camera 220 (Step S104). In other words, for the first period since the event recording data is stored or an event has occurred, the face detection unit 129 detects a human face from the second captured data captured by the second camera 220.

When the second camera 220 is used in the aforementioned application, the second camera 220 and the face detection unit 129 may not be constantly operated. When, for example, the event detection unit 127 has detected an event, the second camera 220 may start capturing images and the face detection unit 129 may start detecting the face.

When the face detection unit 129 has not detected a human face in Step S104 (Step S104: No), the process moves to Step S103, where it is determined whether the first period has passed. When the recording controller 123 has determined, in Step S103, that the first period has passed (Step S103: Yes), i.e., when it is determined that a human face has not been detected during the first period, the process moves to Step S107.

When the face detection unit 129 has detected a human face within the first period in Step S104 (Step S104: Yes), the reproduction controller 124 reproduces the event recording data stored in Step S102 based on the event detected in Step S101 (Step S105). In other words, when the human face has been detected within the first period (Step S104: Yes), the event recording data generated due to the occurrence of an event just before the first period is counted is reproduced.

In Step S105, the reproduction controller 124 reproduces the event recording data stored in the recording unit 240 and the event recording data that has been reproduced is displayed on the display unit 260 by the control performed by the display controller 126.

After the event recording data has been reproduced in Step S105, the recording controller 123 determines whether the reproduction of the event recording data has been ended (Step S106). The determination in Step S106 is made when, for example, reproduction of all the event recording data, which is the target to be reproduced, has been completed or when the operation unit 250 has accepted a reproduction end operation. When it is determined in Step S106 that the reproduction of the event recording data has been completed (Step S106: Yes), the process moves to Step S107.

After the reproduction of the event recording data, which is the target to be reproduced, has been started in Step S105, the reproduction controller 124 may repeatedly reproduce the event recording data, which is the target to be reproduced, until the operation unit 250 accepts the reproduction end operation.

When it is determined to be No in Step S101, it is determined to be Yes in Step S103, or it is determined to be Yes in Step S106, the recording controller 123 determines, in the processing of Step S107, whether the recording of the first captured data has been ended. It is determined, in Step S107, that the recording has been ended when, for example, the engine, the power supply or the like of the vehicle, which is the moving body, is turned off and the operation of the recording reproduction apparatus 10 is ended. Alternatively, the recording may be ended when the operation unit 250 accepts an instruction for ending the recording reproduction processing.

According to the aforementioned processing, even when the user who desires to check the circumstances of an event such as an accident by reproducing the event recording data does not know the functions of the recording reproduction apparatus 10 very well, it is possible to check video images recorded as the event recording data easily and promptly.

As a modified example of the first embodiment, the face detection unit 129 may determine, in Step S104, that a human face has been detected when the human face that has come close to the display surface 261 of the display unit 260 is detected. When the recording reproduction apparatus 10 is a dashboard camera, the second camera 220 is installed in such a way that it is directed toward the driver and the passenger of the vehicle. Therefore, when it is desired to check the event recording data displayed on the display unit 260, the face is made close to the recording reproduction apparatus 10 or the recording reproduction apparatus 10 is removed from the vehicle and then the recording reproduction apparatus 10 is made close to the face.

According to the aforementioned processing, it is possible to enable the user who desires to check the circumstances of an event such as an accident by reproducing the event recording data to check video images recorded as the event recording data more appropriately.

The face detection unit 129 determines that the human face detected from the second captured data has come close to the display surface 261 of the display unit 260 when, for example, the human face detected from the second captured data has come close to the display surface 261 of the display unit 260 so that the distance between the human face and the display surface 261 becomes smaller than about 50 cm. The distance based on which it is determined that the human face has come close to the display surface 261 may be changed depending on the size of the display surface 261 of the display unit 260, i.e., the size of the display panel. Further, the distance based on which it is determined that the human face has come close to the display surface 261 may be such a distance at which it is possible to differentiate a person who is not gazing at the display surface 261 from a person who is gazing at the display surface 261.

Further, the face detection unit 129 may determine that a human face has been detected when the human face detected in Step S104 is oriented to the front side or the substantially front side. Even when, for example, the face of the human who has come close to the display surface 261 of the display unit 260 has been detected, a case in which it is not intended to check the event recording data can be excluded. The face detection unit 129 detects the contour of the face and the positions of the both eyes in the detected human face and determines, from the positional relation thereof, whether the human face is oriented to the front side or the substantially front side.

Figure 6:
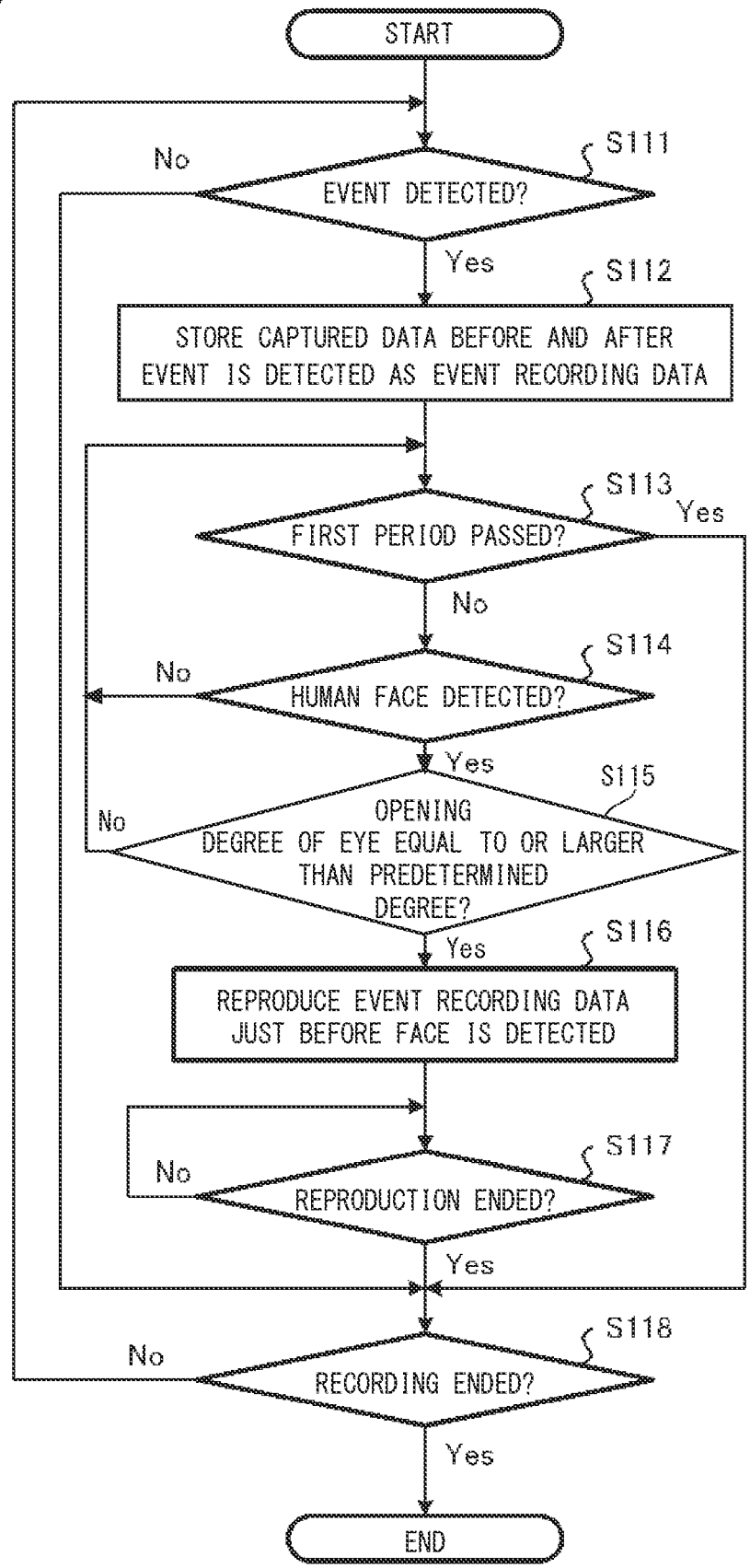
FIG. 6 is a flowchart showing a process example of a recording reproduction apparatus according to a second embodiment of the present disclosure.

Referring next to FIG. 6, a second embodiment of the present disclosure will be explained. Since many configurations and processes of the recording reproduction apparatus 10 according to the second embodiment are the same as those of the first embodiment, descriptions thereof will be omitted.

FIG. 6 is a flowchart showing a process example according to the second embodiment executed by the recording reproduction apparatus 10. Since processing of Step S101 and Step S111, Step S102 and Step S112, Step S103 and Step S113, Step S105 and Step S116, Step S106 and Step S117, and Step S107 and Step S118 is common in the processing shown in FIG. 5 and the processing shown in FIG. 6, descriptions thereof will be omitted.

In Step S114, the face detection unit 129 detects a human face from the second captured data and specifies the eye in the detected human face, thereby acquiring the opening degree of the specified eye. The opening degree of the eye detected here may be such a degree by which it can be determined, for example, whether the eye is closed or opened.

When the face detection unit 129 has detected the human face within the first period in Step S114 (Step S114: Yes), the face detection unit 129 determines whether the opening degree of the eye in the detected face is equal to or larger than a predetermined degree (Step S115). The determination made in Step S115 may be determination regarding whether the eye is closed or opened based on the opening degree of the eye.

When it is determined in Step S115 that the opening degree of the eye in the detected face is equal to or larger than a predetermined degree or the eye is opened (Step S115:

Yes), the process moves to Step S116. When it is determined in Step S115 that the opening degree of the eye in the detected face is smaller than the predetermined degree or the eye is closed (Step S115: No), the process moves to Step S113. Even when it is determined to be No in Step S115, if the operation unit 250 has accepted an instruction for starting reproduction, the reproduction of the event recording data is started.

According to the aforementioned processing, it is possible to enable the user who desires to check the circumstances of an event such as an accident by reproducing the event recording data to check video images recorded as the event recording data more appropriately and to exclude a case in which it is not intended for the person of the detected face to check the event recording data.

Figure 7:
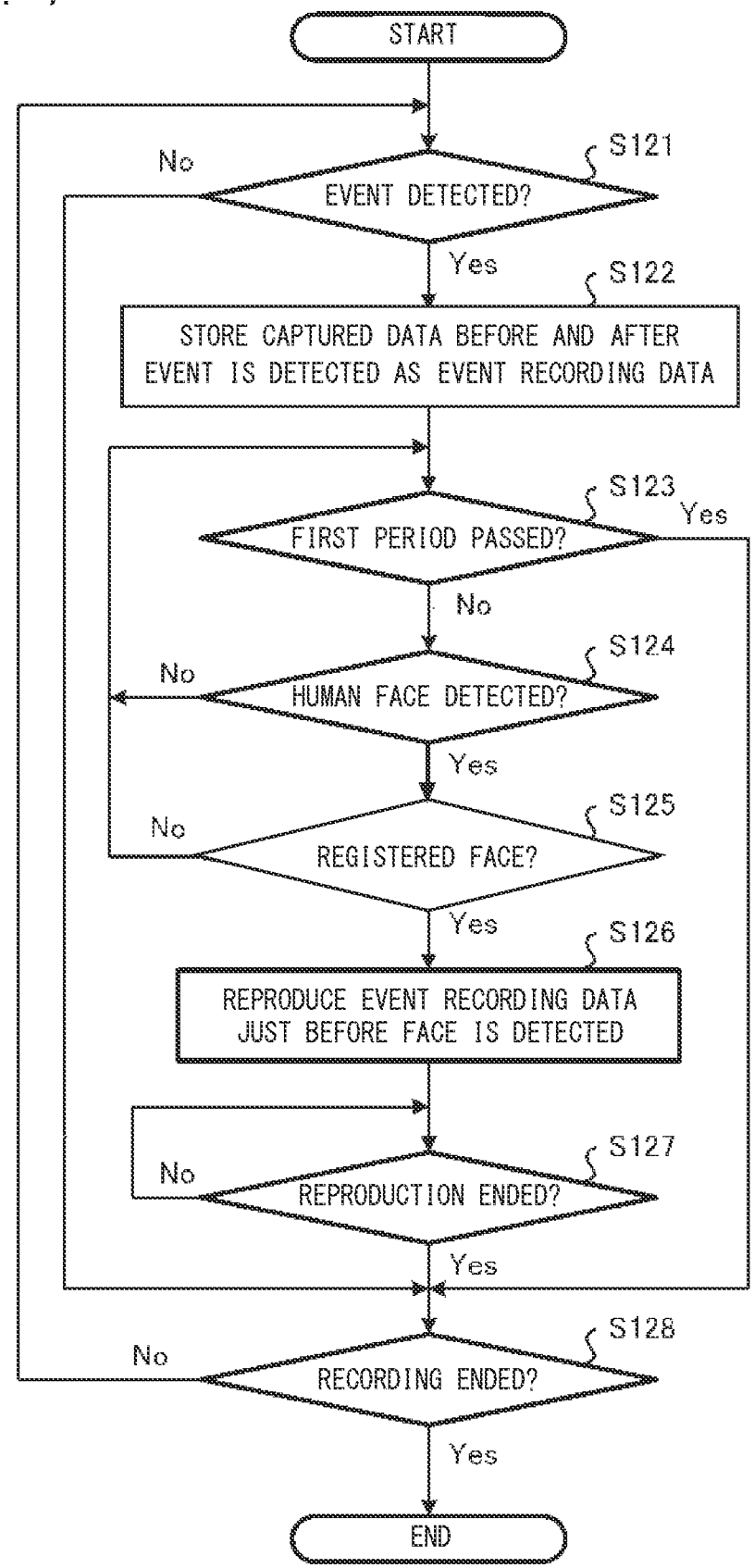
FIG. 7 is a flowchart showing a process example of a recording reproduction apparatus according to a third embodiment of the present disclosure.

Referring next to FIG. 7, a third embodiment of the present disclosure will be explained. Since many configurations and processes of the recording reproduction apparatus 10 according to the third embodiment are the same as those of the first embodiment, descriptions thereof will be omitted.

FIG. 7 is a flowchart showing a process example according to the third embodiment executed by the recording reproduction apparatus 10. Since the processing of Step S101 and Step S121, Step S102 and Step S122, Step S103 and Step S123, Step S105 and Step S126, Step S106 and Step S127, and Step S107 and Step S128 is common in the processing shown in FIG. 5 and the processing shown in FIG. 7, descriptions thereof will be omitted.

When the face detection unit 129 has detected a human face within the first period in Step S124 (Step S124: Yes), the face detection unit 129 determines whether the detected face is a human face registered in advance (Step S125).

When it is determined in Step S125 that the detected face is a face registered in advance (Step S125: Yes), the process moves to Step S126. When it is determined in Step S125 that the detected face is not a face registered in advance (Step S125: No), the process moves to Step S123. When the operation unit 250 has accepted an instruction for starting reproduction even when it is determined to be No in Step S125, reproduction of the event recording data is started.

According to the aforementioned processing, when a person registered in advance such as a driver of the vehicle on which the recording reproduction apparatus 10 is mounted desires to check the circumstances of an event such as an accident by reproducing the event recording data, this person can check video images recorded as the event recording data more appropriately. When, for example, the vehicle on which the recording reproduction apparatus 10 is mounted involves in the accident, the event recording data can be definitely checked with the driver of the vehicle, who is the person involved in the accident. It is thus possible to prevent the accident from being analyzed without including the person involved in the accident.

The third embodiment described with reference to FIG. 7 can be applied also to a case in which the face detection unit 129 has detected a plurality of human faces in Step S124. When, for example, the plurality of human faces have been detected in Step S124, it is determined in Step S125 whether the plurality of human faces include the human face registered in advance. When it is determined in Step S125 that the human face registered in advance is included (Step S125: Yes), the process moves to Step S126. When the human face registered in advance is not included (Step S125: No), the process moves to Step S123.

According to the aforementioned processing, when a person registered in advance such as a driver of the vehicle on which the recording reproduction apparatus 10 is mounted desires to check the circumstances of an event such as an accident by reproducing the event recording data, this person can check video images recorded as the event recording data more appropriately. When, for example, the vehicle on which the recording reproduction apparatus 10 is mounted involves in the accident, the event recording data can be definitely checked with the driver of the vehicle, who is the person involved in the accident. It is thus possible to prevent the accident from being analyzed without including the person involved in the accident.

Figure 8:
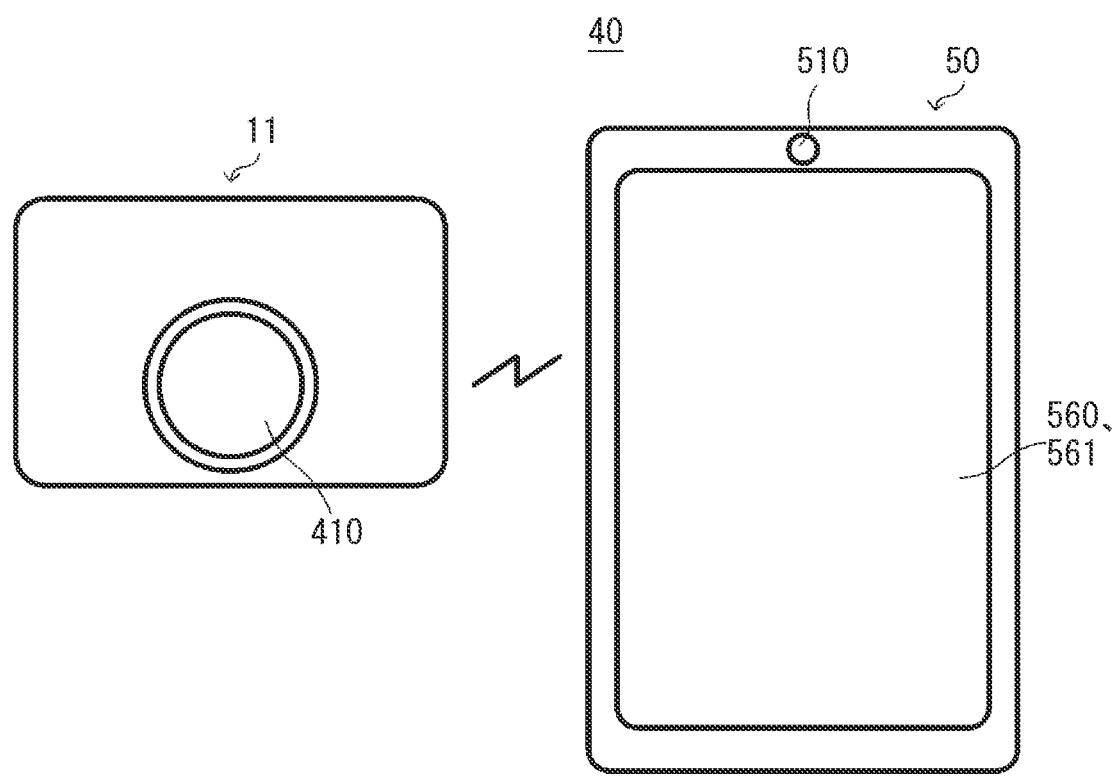
FIG. 8 is a diagram conceptually showing a configuration of a recording reproduction apparatus according to a fourth embodiment of the present disclosure.
Figure 9:
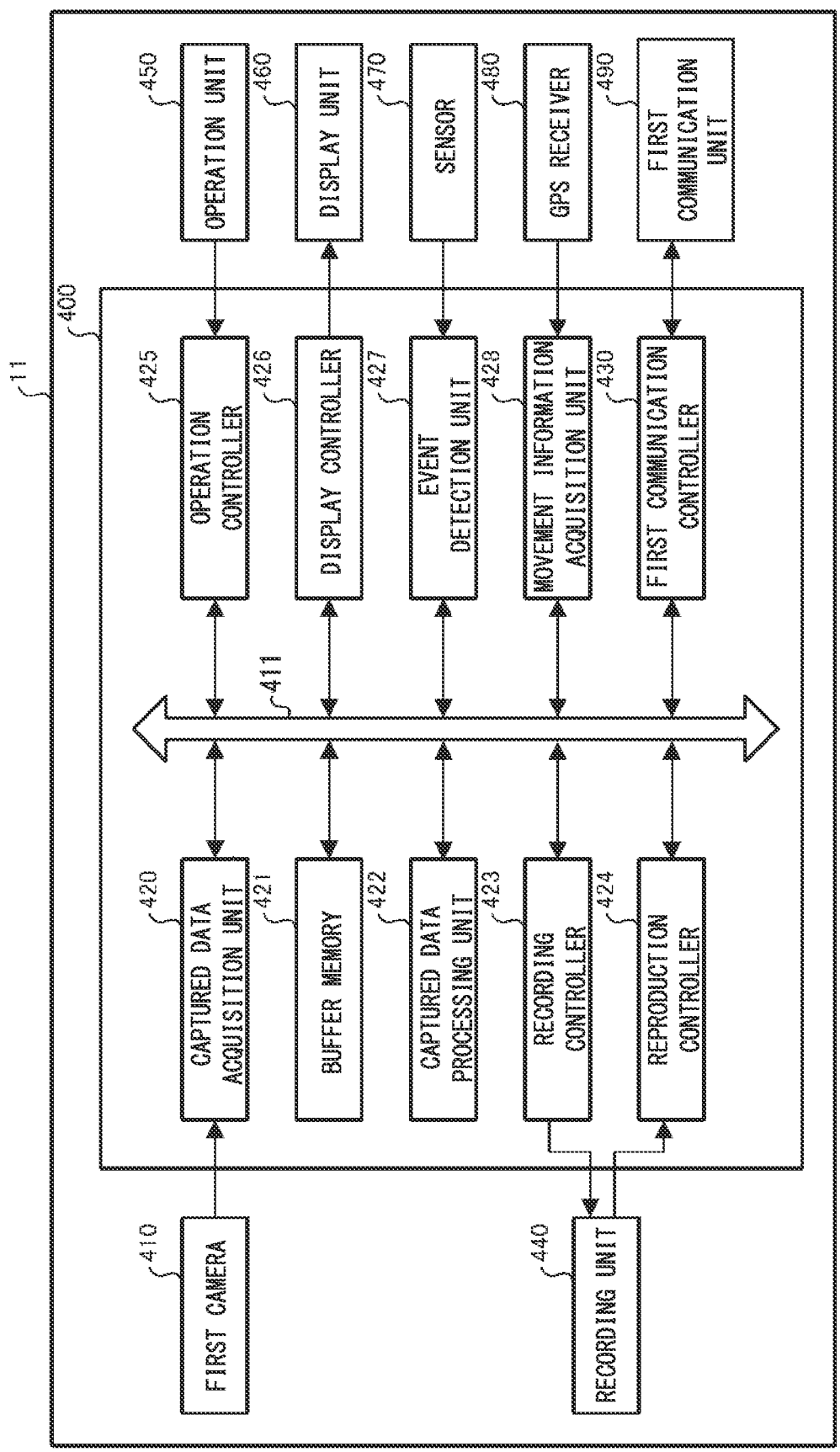
FIG. 9 is a block diagram showing a configuration of a vehicle-side apparatus that forms the recording reproduction apparatus according to the fourth embodiment of the present disclosure.
Figure 10:
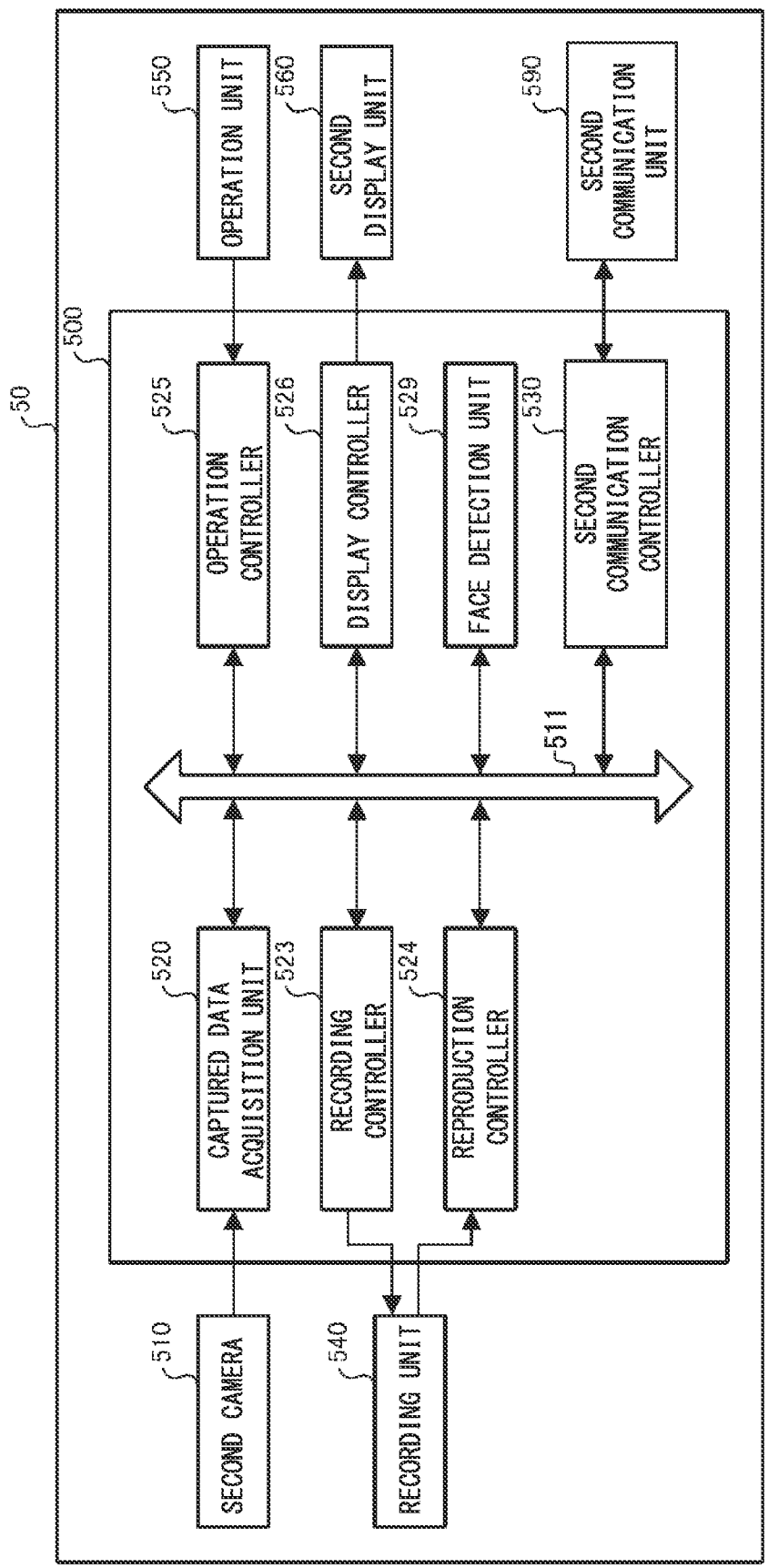
FIG. 10 is a block diagram showing a configuration of a mobile terminal that forms the recording reproduction apparatus according to the fourth embodiment of the present disclosure.

Referring next to FIGS. 8 to 10, a fourth embodiment of the present disclosure will be explained. A recording reproduction apparatus 10 according to the fourth embodiment is formed of a plurality of apparatuses. FIG. 8 is a diagram conceptually showing a configuration of the recording reproduction apparatus according to the fourth embodiment of the present disclosure, and a recording reproduction apparatus 40 is formed of a vehicle-side apparatus 11 and a mobile terminal 50. The configuration of the recording reproduction apparatus 40 is not limited to that described in this embodiment as long as the recording reproduction apparatus 40 is formed of a combination of apparatuses having similar functions.

In FIG. 8, the vehicle-side apparatus 11 is similar to the recording reproduction apparatus 10 shown in FIGS. 2 and 3. When the vehicle-side apparatus 11 is mounted above the windshield of the vehicle as the dashboard camera in such a way that it is directed toward the front side of the vehicle, the first camera 410 in FIG. 2 is able to capture images of a front area, which is an outside of the vehicle, via the windshield of the vehicle. The mobile terminal 50 includes a second camera 510 and a display surface 561 of a second display unit 560 arranged on the same plane or on the substantially same plane in a housing of the mobile terminal 50 in such a way that the second camera 510 and the display surface 561 of the second display unit 560 are close to each other.

The vehicle-side apparatus 11 and the mobile terminal 50 are connected by wireless communication. The vehicle-side apparatus 11 and the mobile terminal 50 are at least configured in such a way that the event recording data generated in the vehicle-side apparatus 11 is transmitted to the mobile terminal 50 using wireless communication. Therefore, in the vehicle-side apparatus 11 and the mobile terminal 50, processing for establishing communication such as pairing is performed in advance.

FIG. 9 is a block diagram showing a configuration of the vehicle-side apparatus forming the recording reproduction apparatus according to the fourth embodiment of the present disclosure. The difference between the vehicle-side apparatus according to the fourth embodiment and the dashboard camera that functions as the recording reproduction apparatus 10 shown in FIG. 1 is that the vehicle-side apparatus 11 needs not include the second camera and the face detection unit and the vehicle-side apparatus 11 includes a first communication controller 430 and a first communication unit 490 that communicate with the mobile terminal 50. The other configurations in FIG. 9 are common to those shown in FIG. 1.

FIG. 10 is a block diagram showing a configuration of the mobile terminal that forms the recording reproduction apparatus according to the fourth embodiment of the present disclosure. The mobile terminal 50 includes the second camera 510, a face detection unit 529, and a second communication controller 530 and a second communication unit 590 that communicate with the vehicle-side apparatus 11.

In FIG. 10, the second camera 510 captures an area in the direction that is opposed to the display surface 561 of the second display unit 560. The components shown in FIG. 10 are similar to those shown in FIG. 1.

A process example performed by the recording reproduction apparatus 40 shown in FIGS. 8 to 10 will be explained using the example shown in FIG. 5. In the processing performed by the recording reproduction apparatus 40 based on FIG. 5, descriptions of the processing the same as that described in the first embodiment will be omitted. Further, the processing performed by the recording reproduction apparatus 40 is not limited to being applied to the first embodiment and may be applied also to other embodiments. When the processing performed by the recording reproduction apparatus 40 is started, the vehicle-side apparatus 11 and the mobile terminal 50 are paired with each other and can perform communication with each other.

When the event detection unit 427 of the vehicle-side apparatus 11 has determined in Step S101 that an event has been detected (Step S101: Yes), the recording controller 423 transmits the first captured data including the data at the event occurrence timing detected in Step S101 to the mobile terminal 50 as the event recording data using the first communication unit 490 as processing that corresponds to Step S102. Further, in the mobile terminal 50, the recording controller 523 stores the event recording data received in the second communication unit 590 in the recording unit 540.

When the event recording data is stored in the recording unit 540 of the mobile terminal 50 in Step S102, the recording controller 523 determines whether the first period has passed after the storage of the event recording data in Step S102 (Step S103).

When the recording controller 523 determines in Step S103 that the first period has not passed (Step S103: No), the face detection unit 529 of the mobile terminal 50 determines whether the human face has been detected from the second captured data captured by the second camera 510 (Step S104). In other words, the face detection unit 529 detects a human face from the second captured data captured by the second camera 510 for the first period after the event recording data has been stored or after an event has occurred.

When the second camera 512 is used in the aforementioned applications, the second camera 510 and the face detection unit 529 may not always be operated. When, for example, the second communication unit 590 has received the event recording data or when the recording controller 523 has stored the event recording data, the second camera 510 may start capturing images and the face detection unit 529 may start detecting a face.

When the face detection unit 529 has detected a human face within the first period in Step S104 (Step S104: Yes), the reproduction controller 524 reproduces the event recording data that has been received from the vehicle-side apparatus 11 and stored in the recording unit 540 (Step S105). The event recording data reproduced by the reproduction controller 524 is displayed in the second display unit 560 of the mobile terminal 50. In other words, when the human face has been detected in the front of the mobile terminal 50 within the first period (Step S104: Yes), the event recording data generated due to the occurrence of an event just before the first period is counted is reproduced in the mobile terminal 50.

According to the aforementioned processing, even when the user who wants to check the circumstances of an event such as an accident by performing reproduction of the event recording data does not know the functions of the recording reproduction apparatus 10 very well, this user can check video images recorded as the event recording data easily and promptly using, for example, another apparatus such as the mobile terminal 50.

Note that the present disclosure is not limited to the above-described embodiments and may be changed as appropriate without departing from the scope of the present disclosure. For example, while the first period has been described as, for example, a fixed value such as ten minutes in the processing of Step 103S etc., the first period may be a period that varies depending on conditions. Further, it is possible that the driver and the passenger whose faces are registered in advance may not be able to participate in the investigation of an accident depending on the magnitude of the accident. In this case, reproduction of the event recording data can be performed by normal operations.

Further, the program(s) for causing a computer to execute the aforementioned processing can be stored using any type of non-transitory computer readable media and provided to the computer operating as a recording reproduction apparatus.

The present disclosure is available as a recording reproduction apparatus for recording and reproducing captured data captured in a vehicle.

What is claimed is:

1. A reproduction apparatus comprising:
   a processor coupled to a memory storing instructions to permit the processor to function as:
   a communication unit configured to acquire event recording data captured by another apparatus;
   a display unit configured to display an image;
   a captured data acquisition unit configured to acquire captured data captured by a camera that captures an image in a direction that is opposed to a display surface of the display unit;
   a face detection unit configured to detect a human face from the captured data;
   a reproduction controller configured to reproduce the event recording data when the face detection unit has detected a human face within a predetermined period after storage of the event recording data acquired by the communication unit in the another apparatus; and
   a display controller configured to cause the display unit to display the event recording data reproduced by the reproduction controller.

2. The reproduction apparatus according to claim 1, wherein the face detection unit detects whether the detected human face has come close to the display surface of the display unit, and
   wherein the reproduction controller reproduces the event recording data when the face detection unit has determined that a human face has come close to the display surface of the display unit within a predetermined period after the storage of the event recording data acquired by the communication unit in the another apparatus.

3. The reproduction apparatus according to claim 1, wherein the face detection unit detects a human face registered in advance, and
   wherein the reproduction controller reproduces the event recording data when the face detection unit has detected a human face registered in advance within a predetermined period after the storage of the event recording data after the storage of the event recording data acquired by the communication unit in the another apparatus.

4. The reproduction apparatus according to claim 3, wherein the reproduction controller reproduces the event recording data when the face detection unit has detected a plurality of faces including a human face registered in advance within a predetermined period after the storage of the event recording data acquired by the communication unit in the another apparatus.

5. A reproduction method comprising:
   acquiring event recording data captured by another apparatus;
   acquiring captured data captured by a camera that captures an image in a direction that is opposed to a display surface;
   detecting a human face from the captured data;
   reproducing the event recording data when the human face has been detected in the detecting the human face within a predetermined period after storage of the event recording data acquired in the another apparatus; and
   causing the display surface to display the event recording data reproduced in the reproducing the event recording data.

6. A non-transitory computer readable medium storing a program for causing a computer operating as a recording reproduction apparatus to execute:
   acquiring event recording data captured by another apparatus;
   acquiring captured data captured by a camera that captures an image in a direction that is opposed to a display surface configured to display an image;
   detecting a human face from the captured data;
   reproducing the event recording data when the human face has been detected within a predetermined period after storage of the event recording data acquired in the another apparatus; and
   causing the display surface to display the event recording data reproduced in the reproducing the event recording data.

* * * * *